No. 796,150. PATENTED AUG. 1, 1905.
T. A RYLES.
FRUIT SHEARS.
APPLICATION FILED MAY 22, 1905.

Witness
Bessie Porfinkel
Leon Bolton

Inventor
Thos. A. Ryles
By
F. M. Wright,
Attorney

UNITED STATES PATENT OFFICE.

THOMAS A. RYLES, OF POMONA, CALIFORNIA.

FRUIT-SHEARS.

No. 796,150.  Specification of Letters Patent.  Patented Aug. 1, 1905.

Application filed May 22, 1905. Serial No. 261,485.

*To all whom it may concern:*

Be it known that I, THOMAS A. RYLES, a citizen of the United States, residing at Pomona, in the county of Los Angeles and State of California, have invented certain new and useful Improvements in Fruit-Shears, of which the following is a specification.

This invention relates to improved fruit-shears, the object of the invention being to provide shears or clippers for cutting the stems of oranges or other fruit, so as not to injure the fruit.

Figure 1:
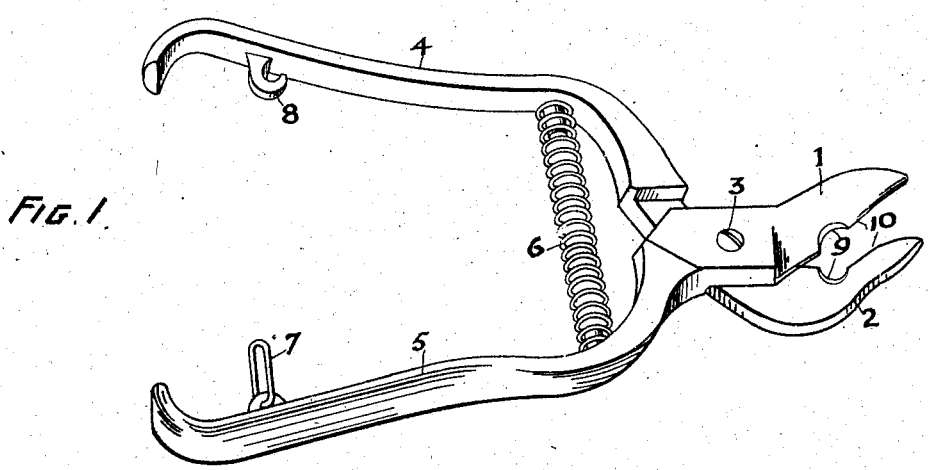
Figure 2:
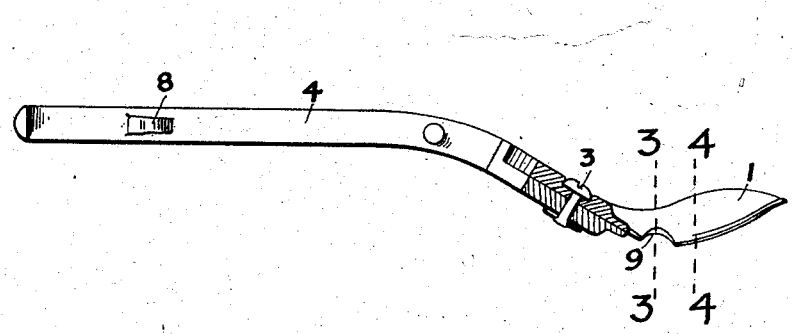
Figure 3:
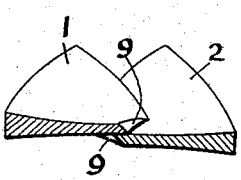
Figure 4:
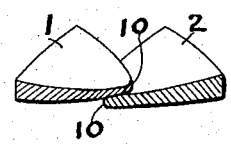

In the accompanying drawings, Figure 1 is a perspective view of the shears. Fig. 2 is a central longitudinal section of the same. Figs 3 and 4 are enlarged detail sectional views on the lines 3 3 and 4 4 of Fig. 2.

Referring to the drawings, 1 2 represent the blades of the shears crossing each other and pivoted together, as shown at 3, and extended to form handles 4 5. Said handles and blades normally open under the pressure of a compressed spring 6. A link 7, permanently attached to one of said handles and engaging a hook 8 of the other handle, serves to hold said handles together when desired.

The novelty of the invention consists in the peculiar form of the blades. The cutting edge of each blade is formed with a semicircular portion 9, having a sharp cutting edge; but beyond or outside of said semicircular portion the edge is blunt or rounded, as shown at 10. Therefore the blades are incapable of cutting except at the semicircular parts 7 thereof. As shown in Fig. 2, the blades are concavo-convex in form. Hence the convex sides of the blade can be applied close to the fruit and the stem can be cut without injuring the fruit.

With clippers of this construction the operator, however careless, cannot cut any part of the fruit, but only the stem. Moreover, when the circular parts of the edges of the blade close around the stem there is no tendency of the stem to be squeezed outward, and consequently it is cut with much less effort.

I claim—

1. Fruit-shears, the blades of which have substantially semicircular recesses in their edges, said edges being sharp in said recesses but rounded or blunt at the sides of said recesses, substantially as described.

2. Fruit-shears, the blades of which are concavo-convex in form and have substantially semicircular recesses in their edges, said edges being sharp in said recesses but rounded or blunt at the sides of said recesses, substantially as described.

In witness whereof I have hereunto set my hand in the presence of two subscribing witnesses.

THOMAS A. RYLES.

Witnesses:
  GEO. W. PIERCE,
  ALLEN P. NICHOLS.